United States Patent [19]

McFarland, Jr.

[11] Patent Number: 4,731,995

[45] Date of Patent: Mar. 22, 1988

[54] EXHAUST MANIFOLD AND AN IMPROVED EXHAUST MANIFOLD, INTAKE MANIFOLD AND ENGINE COMBINATION

[75] Inventor: James D. McFarland, Jr., Torrance, Calif.

[73] Assignee: Edelbrock Corporation, El Segundo, Calif.

[21] Appl. No.: 927,342

[22] Filed: Nov. 5, 1986

[51] Int. Cl.$^4$ .................. F02B 27/02; F02B 75/20
[52] U.S. Cl. ............................. 60/313; 123/52 MB; 123/52 MV
[58] Field of Search ............ 60/313, 312; 123/52 MB, 123/65 E, 52 MV

[56] References Cited

U.S. PATENT DOCUMENTS

| | | | |
|---|---|---|---|
| 3,845,746 | 11/1974 | Elsbett | 123/52 MB |
| 4,461,248 | 7/1984 | McFarland | 123/52 MV |
| 4,510,896 | 4/1985 | Rutschmann | 123/52 MV |

Primary Examiner—Douglas Hart
Attorney, Agent, or Firm—Christie, Parker & Hale

[57] ABSTRACT

An exhaust manifold for an engine has sets of branches tuned to the fundamental frequency of exhaust products but with the branch length of the sets different so that the engine speed at which resonance occurs in each set is different. An inlet manifold has runner sets with each set being paired with an exhaust manifold branch set serving the same cylinders and tuned to effect resonance of combustion air in the runners at the same engine speed that resonance occurs in its associated exhaust branches.

21 Claims, 10 Drawing Figures

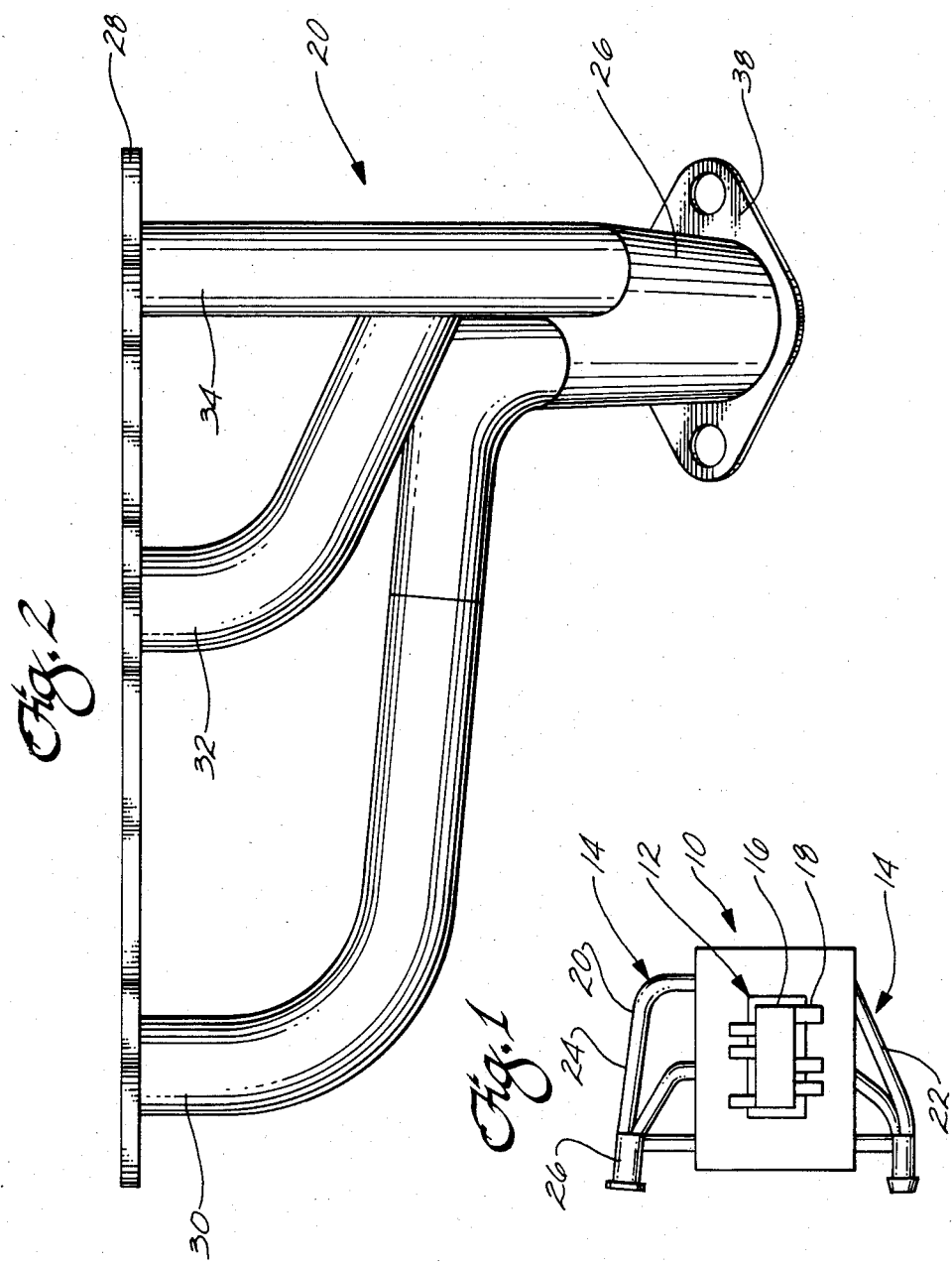

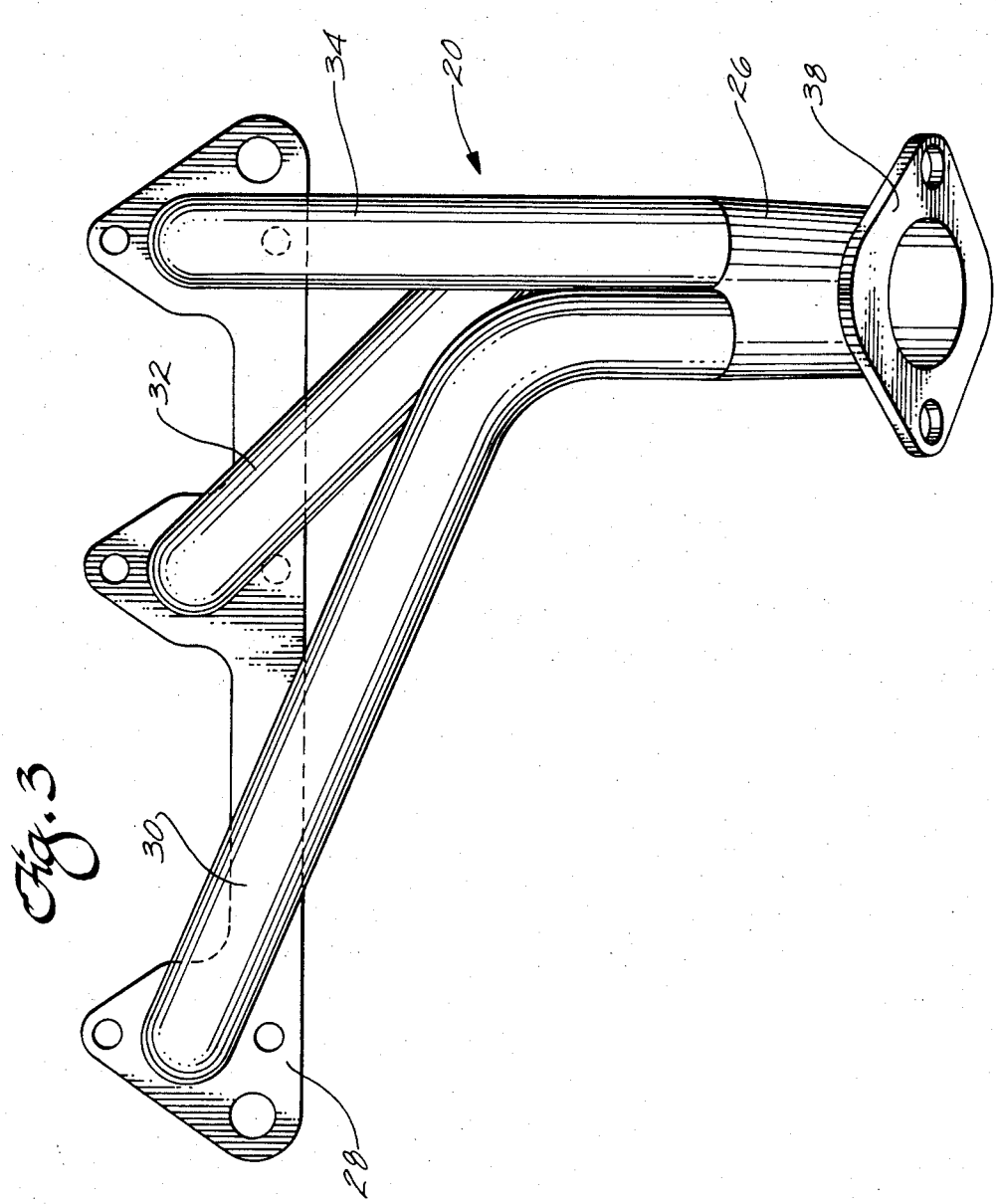

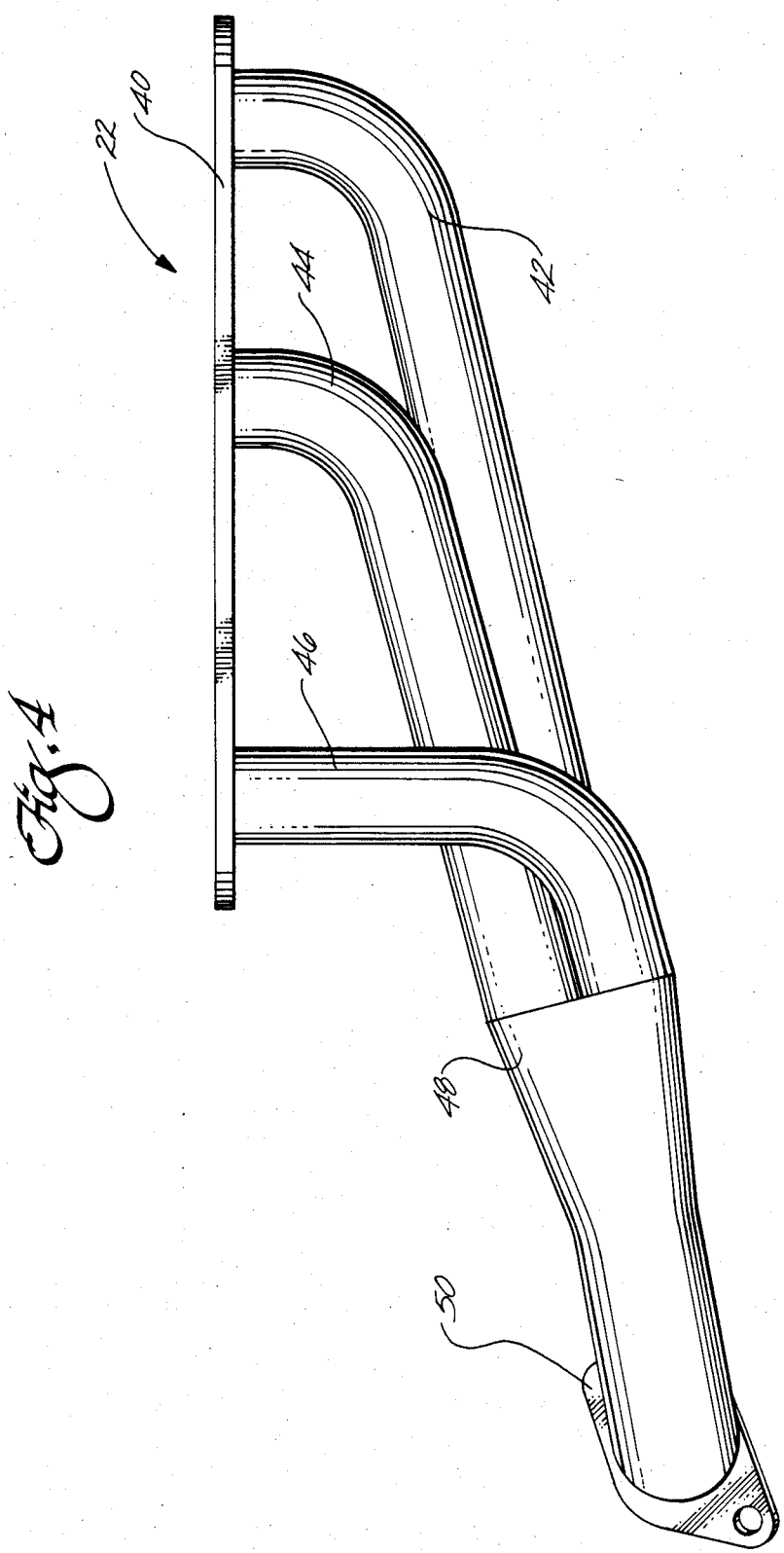

PROFILE AT HEAD          ENTRY~PLAN VIEW
             RUNNERS 2, 4 & 6

PROFILE AT HEAD          ENTRY~PLAN VIEW
             RUNNERS 1, 3 & 5

EXHAUST MANIFOLD AND AN IMPROVED EXHAUST MANIFOLD, INTAKE MANIFOLD AND ENGINE COMBINATION

BACKGROUND OF THE INVENTION

The present invention relates to exhaust and intake manifolds for reciprocating internal combustion engines. More in particular, the present invention relates to unique exhaust and intake manifolds that produce a wide band of relatively high engine torque.

An intake manifold of an internal combustion engine conducts combustion air to the cylinders of the engine where it burns with fuel. In a fuel injected engine, the manifold conducts only air; in a carbureted engine, a manifold also conducts fuel with the air. In a carbureted engine, the carburetor typically mounts on a plenum of the manifold. The fuel and air mixture enters the plenum from the carburetor, and from the plenum travels to the cylinders through ducts called runners. The runners exit into inlet ports in the cylinder head of the engine. These ports lead to the cylinders through inlet valves.

Generally, a vacuum in each cylinder created by downward piston movement during an inlet stroke draws the fuel and air mixture into the cylinder. A supercharger or a turbocharger can augment this driving force.

The burning of the fuel-air mixture in the cylinders generates high pressure products of combustion that expand against the pistons during an expansion stroke to produce the engine's power. Exhaust valves from the cylinders open while the products of combustion are still at high pressure relative to atmospheric pressure. This residual pressure, called blow-down pressure, and the ascent of the pistons in the cylinders force the products of combustion from the cylinders into an exhaust manifold.

The dynamics of induction of fuel and air into an engine and the exhaust of products of combustion from an engine are very complicated, making generalizations difficult. Some of the factors affecting induction and exhaust include intake and exhaust valve timing, piston speed, gas inertia, gas friction, resonance, intercylinder interference, and manifold geometry.

The intake valve timing of today's internal combustion engines has an inlet valve starting to open while its companion exhaust valve is in its final stages of closing and before its piston reaches top dead center. An inlet valve closes several crank degrees after its piston reaches bottom dead center. On the exhaust side, the exhaust valve opens several degrees before bottom dead center on the expansion stroke and closes after top dead center and after the exhaust stroke. The timing of inlet and exhaust valve opening and closing accommodates the several crank degrees of engine revolution needed to get them open an effect amount and to effectively close and to accommodate gas inertia.

It is quite apparent that the more mixture inducted into a cylinder with each cycle, the more power an engine will have, the more efficient it will be. A measure of engine efficiency reflecting the amount of cylinder charge is "volumetric efficiency," which is the volume of air a cylinder actually receives divided by the volume swept by the piston. With no induction loss, if the air travels fast in the runners towards the end of the induction cycle, its inertia overcomes the pressure build up at this time and results in an additional amount of mixture charged into the cylinders and an increase in volumetric efficiency compared with a charge from slower air. More specifically, increasing the velocity of the mixture at relatively low engine speeds enhances torque. (At high engine speeds, induction losses can more than offset gains from gas inertia.)

Piston speed directly measures the pumping characteristics of an engine. The higher the piston speed, the more mixture the pistons induct into the engine in a given time period. Piston speed also generates pressure pulses that affect movement of the mixture in the intake manifold. As the piston descends, a negative pressure signal results and this signal travels upstream in the manifold. It is this negative pressure that produces induction. As the piston ascends, it produces a positive pressure signal that travels upstream from the manifold and opposes induction. The magnitude of the signals is a direct function of piston speed, which varies even at constant engine speed. The pressure signals travel at the speed of sound; the mixture travels much slower. The pressure signals can be used to enhance volumetric efficiency by resonance.

My U.S. Pat. No. 4,461,248 describes one way to use pressure signals in an intake manifold to enhance an engine's performance. This patent builds on the long recognized fact that pressure pulses traveling up and down runners can affect the flow of air through runners. As a positive pressure pulse, positive with respect to mean inlet manifold pressure, travels up a runner and reaches atmosphere, which may be in the plenum of the manifold, the air there moves with the disturbance creating a depressed pressure or a locally rarified zone. The resulting negative pressure travels down the runners, and it detrimentally affects the flow of gas in the runners by reducing the pressure differential between the runner and the cylinder. A negative pressure pulse traveling upstream produced by a descending piston reduces the pressure in the plenum: air rushes in to fill the low pressure zone, generating a positive pressure pulse that travels down the runner toward the cylinder.

If a positive pressure pulse arrives at the cylinder at the right time, say when the inlet valve is about to close, the pulse can add significant quantities of mixture to the cylinder to increase the power of the engine by increasing the volumetric efficiency of the engine. When the length of runners is adjusted to take advantage of this phenomenon, it is known as intake manifold tuning. The time it takes for a pressure pulse to travel up and back in a runner depends on runner length. Because the time of the pulse's arrival back at the inlet port must be close to the time the inlet port is about to close, the speed of the engine must coincide with the pulse travel time. Tuning, in short, works in only limited speed ranges. When a manifold is tuned, it is said to resonate in the engine speed range that the positive pressure pulse augments cylinder charges because the pulse adds to the pressure driving the charge into the cylinders.

My '248 patent divides up the runners of an intake manifold into sets, with each set being tuned to produce resonance at engine speed ranges. The patent also teaches that combustion air speed at resonance should be the same as the speed at engine speed maximum torque and to adjust runner cross-sectional area so that this happens. This produces a broader band of high torque in the engine than would be the case with all the runners producing resonating in the same speed range.

As inlet manifold runner tuning was known long before my '248 patent, so was exhaust manifold tuning. Exhaust manifold tuning reduces residual exhaust gas pressure in the cylinders in a selected engine speed range so that the inlet charge sees low resistance. The idea in exhaust manifold tuning is to get a rarified pressure pulse in the vicinity of the exhaust valve just as combustion air begins to enter the cylinder and combustion air into the cylinder to draw products of combustion from the cylinder. In the case of exhaust tuning, the exhaust gas products and not piston motion creates the pressure pulse because of the high value of pressure at the time the exhaust valve opens.

As was recognized in my '248 patent, particularly with engines with modest power outputs, it is important to have a broad band of relatively high torque so that engine performance over a range of engine speeds is good.

It is desirable to enhance the improved performance produced by my '248 patent by using exhaust gas dynamics.

SUMMARY OF THE INVENTION

The present invention provides both alone and in combination with an internal combustion engine and its inlet manifold an improved exhaust manifold. In general the exhaust manifold has a plurality of branches divided into at least a first and a second set for serving the engine cylinders. The branches of the first set are tuned to a predetermined resonant frequency of the products of combustion of the engine to effect resonance within a first selected range of engine speeds. The branches of the second set are tuned to a predetermined resonant frequency of the products of combustion to effect resonance within a second selected range of engine speeds differing substantially from the first selected range of engine speeds to develop a continuous broad band torque of relatively high value.

In greater detail, the exhaust manifold, has a branch for each cylinder of the engine with which it is used. The branches of each set are tuned to the fundamental frequency of the products of combustion of air to effect resonance. Resonance is a function of engine speed and branch length and so one can tune to the fundamental frequency at different engine speeds. The branches lead into at least one collector pipe at their discharged ends. Preferably, the cross-sectional area of the sets of branches differ so that at resonance the velocity of exhaust products through the branches is equal to the velocity of such gases at engine maximum torque. Thus, when one set of branches operates at resonance, exhaust products flowing through them have a speed equal to the speed of such gases at engine maximum torque.

In the combination of the present invention, the exhaust manifold cooperates with an internal combustion of the type having a plurality of cylinders, a reciprocating piston in each cylinder, at least one inlet port and valve into each cylinder, at least one exhaust port and valve from each cylinder, and an inlet manifold for conducting combustion air into the cylinders through the inlet ports. The inlet manifold is old, per se, being the subject of my U.S. Pat. No. 4,461,248. It has sets of runners tuned to predetermined resonant frequencies of air to effect resonance in the manifold at two selected engine speed ranges; it also has combustion air speed at resonance the same as the speed of engine maximum torque. The exhaust manifold is also tuned to a predetermined resonant frequency of the products of combustion of the engine to effect resonance at substantially the same selected two engine speed ranges as the inlet manifold. Thus, the exhaust manifold enhances the effects of the inlet manifold at a selected range of engine speeds in producing augmented performance.

In greater detail, the combination includes the inlet manifold having a first set of runners of equal effective cross-sectional area with respect to one another. The length of at least one of the first set runners corresponds to a resonant frequency of air at standard temperature. The inlet manifold also has a second set of runners of equal effective cross-sectional area with respect to each other. The length of at least one second set runner corresponds to a resonant frequency of air at standard temperature, but at a different range of engine speeds from the first so that a relatively broad band of high torque results. It is also preferred that the cross-sectional area of each first and second set runner be such that at engine speeds within their respective ranges of engine speeds at resonance, combustion air velocity through them is substantially equal to the velocity at engine speed maximum torque. As in the exhaust branches, combustion air will have this preferred velocity at different engine speeds depending on the runners it is in. To effect different engine speeds at which resonance occurs, runner lengths are varied, two lengths corresponding to the desired range of engine speeds at resonance. The exhaust manifold matches the inlet manifold in producing two separate resonance speeds for the engine at the same resonance speeds produced by the inlet manifold. At least one branch for each of two sets of branches is tuned to effect the desired resonance—engine speed correspondence. The speed of exhaust gas in the branches is the same as that at engine speed maximum torque.

These and other aspects and advantages of the present invention will become more apparent from the following description, appended claims, and drawings.

DESCRIPTION OF THE FIGURES

FIG. 1 shows schematically the combination of the intake manifold, exhaust manifold, and balance of the engine of the present invention;

FIG. 2 shows in plan the left side exhaust manifold half of the present invention;

FIG. 3 shows in side elevation the left side half of the exhaust manifold half of the present invention;

FIG. 4 shows in top plan the right exhaust manifold half of the present invention;

DESCRIPTION OF THE PREFERRED EMBODIMENTS

Figure 5:
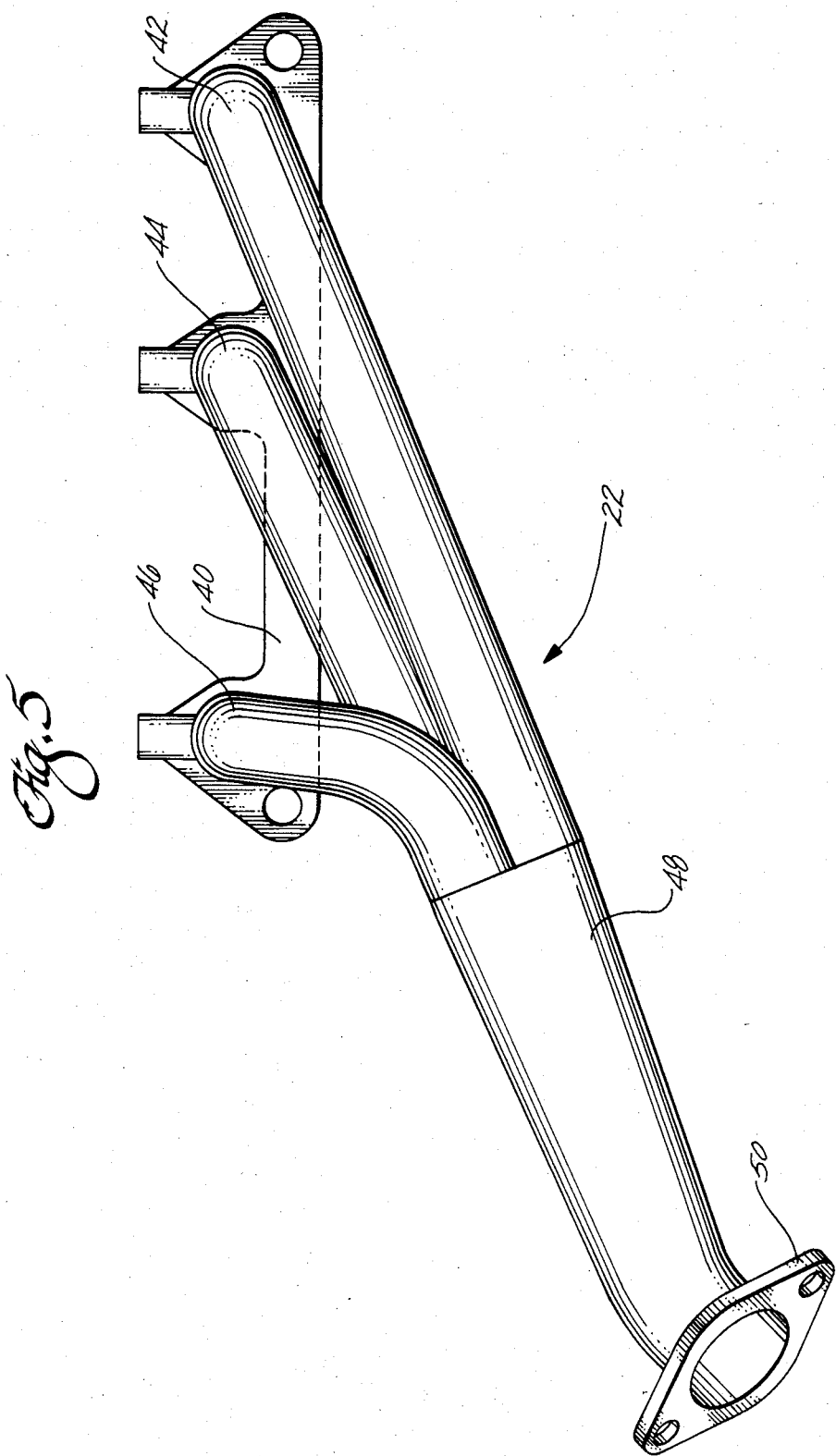
FIG. 5 shows in side elevation the right side exhaust manifold half of the present invention.

With brief reference to FIG. 1, it shows an engine 10 having an intake manifold 12 and an exhaust manifold 14 in accordance with a preferred embodiment of the present invention. In general, intake manifold 12 includes a plenum 16 and a plurality of runners 18 leading from the plenum to the combustion chambers of the engine. In general, exhaust manifold 14 includes left half 20 and right half 22. Each half has a plurality of branches 24 that lead to collector pipes 26, both for the evacuation of products of combustion from the engine.

With reference to FIGS. 2 and 3, they show left half 20 of manifold 14. A mounting of flange 28 mounts the manifold half to the engine. The branches include front branch 30, intermediate branch 32, and rear branch 34. These branches emanate from registration with exhaust ports of the engine and extend generally rearwardly and outwardly to pipe 26. Pipe 26 ends in a mounting flange 38 that connects with the balance of the exhaust system.

With reference to FIGS. 4 and 5, right exhaust manifold half 22 has a mounting flange 40 that connects it to the balance of the engine. A front branch 42, an intermediate branch 44, and a rear branch 46 lead from registration with exhaust ports on the right side of the engine generally rearwardly and outwardly to a collector pipe 48. Pipe 48 ends at a mounting flange 50 that connects to the rest of the exhaust collection system.

The exhaust manifold shown in FIGS. 2 through 5 is for a 2.8 liter Chevrolet V6 engine. The left half manifold branches are of 1¼ inch outside diameter tubing. The right hand manifold half branches are of 1½ inch diameter tubing. The manifolds may be equipped with air injection nozzles, oxygen sensors, and a hot air stove in a standard manner.

The cross-sectional areas of the branches are chosen to produce products of combustion flow through them at resonance at the speed corresponding to the products speed at engine speed maximum torque. That engine speed will be lower for the smaller cross-sectional area branches than the larger cross-sectional area branches.

The cross-sectional area of the branches is chosen to match with associated runners of the inlet manifold so that the velocity of exhaust gases at resonance is the velocity corresponding to engine speed maximum torque.

At least some of the manifold branches have tuned lengths so that the manifold produces resonance in the products of combustion flowing through it preferably at the fundamental frequency of those gases, with each manifold half producing resonance at a different range of engine speeds and at a range corresponding to the range of engine speeds that one of the sets of runners of the inlet manifold produce resonance; that is, the branches match the runners to produce resonance at the same two engine speeds. Resonance is a function of engine speed and length of branch as variables. These two variables are adjusted so that the engine speed at which resonance in the associated runners of the intake manifold occurs. The right and left halves of the exhaust manifold have branches tuned for resonance at different engine speeds so as to produce a relatively flat torque values over a broad range of engine speeds relative to standard arrangements. In the manifold illustrated, the right and left half branches serve cylinders the alternate in the sense of the engine's firing order: the left half serving cylinder 2, 4 and 6 and the right half serving cylinders 1, 3 and 5.

Figure 6:
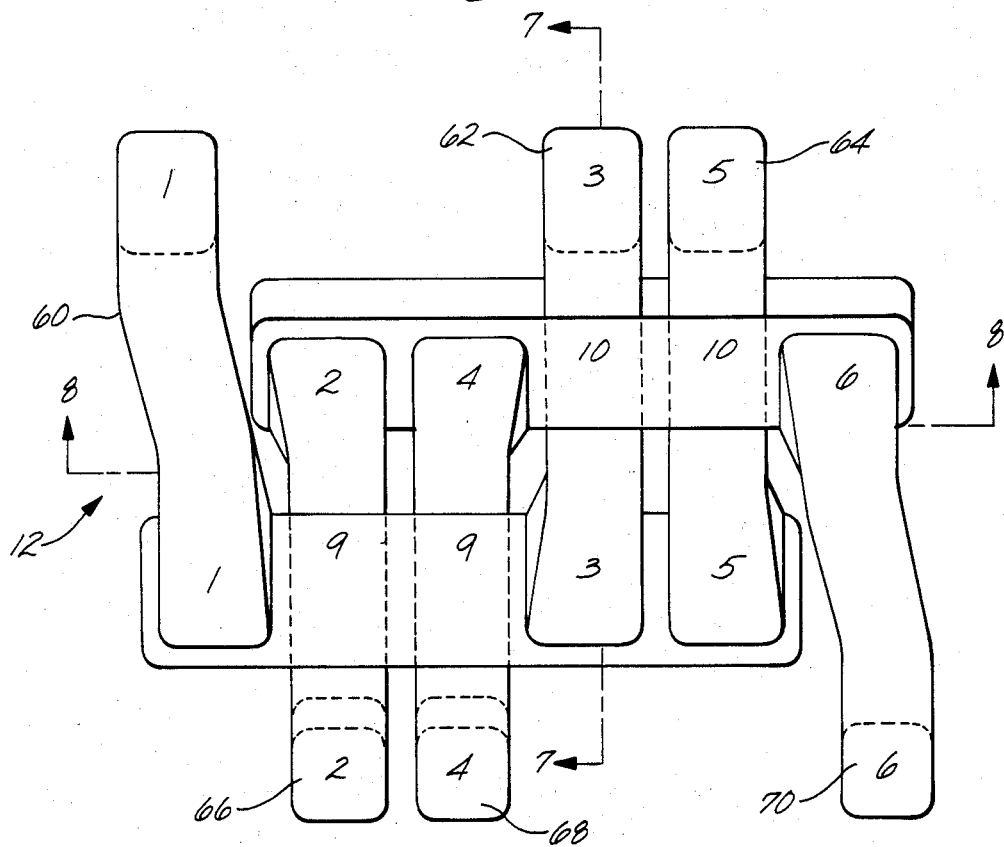
FIG. 6 shows in top plan view the core layout of the intake manifold used in the combination of the present invention.

FIG. 6 shows a core layout for intake manifold 12 used with the exhaust manifold just described. It has six runner cores, 60, 62, 64, 66, 68 and 70. A first set of these are 60, 62, and 64 for cylinders 1, 3 and 5 in the engine's firing order and lead to the right side cylinders of the engine. A second set of these runners 66, 68 and 70 for cylinders 2, 4 and 6 lead to the left side cylinder bank.

Figure 9:
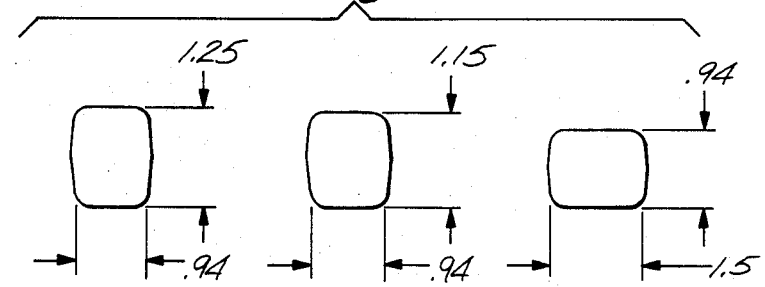
FIG. 9 shows from left to right for runners 2, 4 and 6 in the engine's firing order, the profile at the head the profile in the plane of 9—9 of FIG. 6, and the profile at runner entry at the plenum.

The cross-sectional areas of the runners for each bank differ. The dimensions of runners 66, 68 and 70 are shown in FIG. 9. The cross-sectional area of the runners varies from runner entrance to exit but the mean area is such that the velocity through the runners corresponds to the velocity at engine speed maximum torque at a prescribed range of engine speed and at resonance.

Figure 8:
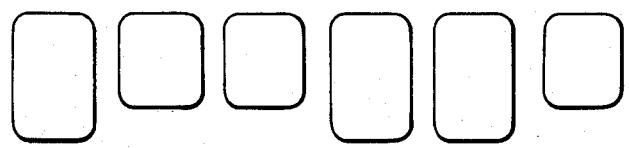
FIG. 8 shows the runner cross-sections in elevation in the plane of 8—8 in FIG. 6.
Figure 10:
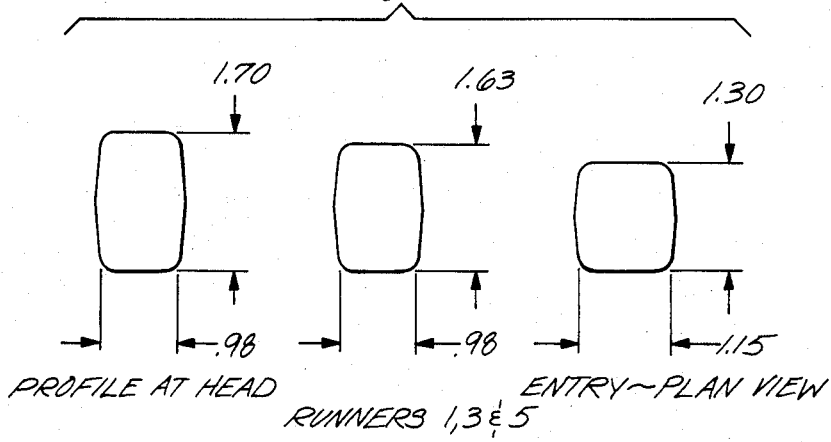
FIG. 10 shows from left to right for runners 1, 3 and 5 in the engine's firing order, the profile at the head, the profile in plane 10—10 of FIG. 6, and the profile at the entry to the runner from the plenum.

In FIG. 10, the cross-sectional areas of runners 60, 62 and 64 show that these runners are larger in cross-sectional area than runners 66, 68 and 70. The dimensions for these runners are shown in FIG. 10. By increasing the areas of these runners with respect to the runners illustrated in FIG. 9, the engine speed at which the velocities of the combustion air through the runners corresponds to the velocity of such air at engine speed maximum torque will increase relative to the engine speed at which the velocities of the combustion air corresponds to engine speed maximum torque for the smaller area runners. FIG. 8 shows visually a comparison of the runner cross-sectional areas.

Figure 7:
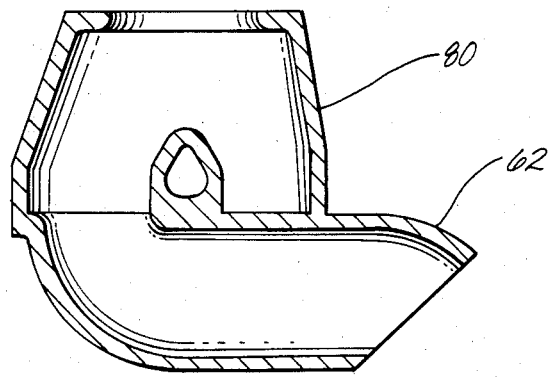
FIG. 7 shows in elevational sectional view taken in the plane of 7—7 of FIG. 6 one runner and plenum combination.

FIG. 7 shows plenum and one runner in elevational section. The plenum is indicated by reference numeral 80. Runner 62 sits below it. FIG. 7 shows that the runners begin in the floor of the plenum at the side of the plenum opposite the cylinder served by the runner. This holds for all of the runners.

The runner and branch sets for the particular engine described, the Chevrolet V6, are tuned to 2500 and 3500 rpm respectively.

The present invention has been described with reference to a preferred embodiment. The spirit and scope of the appended claims should not, however, necessarily be limited to the foregoing description.

I claim:

1. In combination with an internal combustion engine of the type having a plurality of cylinders, a reciprocating piston in each cylinder, at least one inlet port and valve into each cylinder, at least one exhaust port and valve from each cylinder, an inlet manifold for conducting combustion air into the cylinders through the inlet ports, and an exhaust manifold for exhausting products of combustion from the cylinders through the exhaust ports, an improvement comprising:
   (a) at least two different sets of runners of the inlet manifold, each being tuned to a predetermined resonant frequency of air to effect resonance at a different engine speed from the other;
   (b) at least two different sets of branches of the exhaust manifold, each being matched to a different one of the runner sets and tuned to a predetermined resonant frequency of the products of combustion of the engine to effect resonance at the same engine speed as its matched runner set.

2. The improvement claimed in claim 1 wherein:
   (a) the inlet manifold has a first of the sets of runners with runners of equal length and cross-sectional area with respect to one another, the length of each first set runner corresponding to a resonant frequency of air at standard temperature at a first range of engine speeds; and (b) the inlet manifold has a second of the sets of runners with runners of equal length and cross-sectional area with respect to one another, the length of each second set runner corresponding to a resonant frequency of air at standard temperature at a different range of engine speeds from the first runner set.

3. The improvement claimed in claim 2 wherein:

(a) the exhaust manifold has a first of the sets of branches with branches tuned to effect resonance at substantially the same engine speeds as the engine speeds at which the first set of runners effect resonance; and (b) the exhaust manifold has a second of the sets of branches with branches tuned to effect resonance at substantially the same engine speeds as the engine speeds at which the second set of runners effect resonance.

4. The improvement claimed in claim 3 wherein:

(a) the cross-sectional area of each first set runner being such that at an engine speed within the first range of engine speeds combustion air velocity through the first set runner is substantially equal to the combustion air velocity an engine maximum torque; and (b) the cross-sectional area of each second set runner being such that at a second engine speed substantially different from the first engine speed and within the second range of engine speeds the combustion air velocity through the second set of runners is substantially equal to the combustion air velocity at engine maximum torque.

5. The improvement claimed in claim 4 wherein the cross-sectional area of one of the sets of branches is different from the cross-sectional area of the other set of branches.

6. The improvement claimed in claim 5 wherein the cross-sectional area of one of the sets of runners is different from the cross-sectional area of the other set of runners.

7. The improvement claimed in claim 6 wherein the length of one of the sets of branches is different from the length of the other set of branches.

8. The improvement claimed in claim 7 wherein the length of the runners of one of the sets of runners differs from the length of the runners of the other set of runners.

9. In combination with an internal combustion engine of the type having a plurality of cylinders, a reciprocating piston in each cylinder, at least one inlet port and valve into each cylinder, at least one exhaust port and valve from each cylinder, an inlet manifold having a plurality of runners for conducting combustion air into the cylinders through the inlet ports, and an exhaust manifold having a plurality of branches for exhausting products of combustion from the cylinders through the exhaust ports, an improvement comprising:

(a) two sets of runners of the inlet manifold, each set of runners being tuned to produce resonance in combustion air at standard temperature at substantially different engine speeds from the other; and (b) two sets of branches of the exhaust manifold, one set of branches being tuned to produce resonance in exhaust products at the engine speeds that one of the sets of runners produce resonance and the other set of branches being tuned to produce resonance in exhaust products at the engine speeds that the other set of runners produce resonance.

10. The improvement claimed in claim 9 wherein:

the cross-sectional area of a first of the two sets of runners produces a combustion air velocity substantially equal to the velocity of combustion air at engine speed maximum torque at the engine speeds that it produces resonance and the cross-sectional area of the second of the two sets of runners produces a combustion air velocity substantially equal to the velocity of combustion air at engine speed maximum torque at the engine speeds that the second set of runners produces resonance.

11. The improvement claimed in claim 9 wherein the branches are tuned to resonate at the fundamental resonant frequency of the combustion products and the runners are tuned to resonate at a harmonic frequency of the fundamental of resonant frequency of combustion air.

12. The improvement claimed in claim 11 wherein the cross-sectional area of one of the sets of runners differs from the cross-sectional area of the other of the sets of runners.

13. The improvement claimed in claim 12 wherein the cross-sectional area of one of the sets of branches differs from the cross-sectional area of the other of the sets of branches.

14. The improvement claimed in claim 13 wherein the length of one of the sets of branches differs from the length of the other set of branches.

15. The improvement claimed in claim 9 wherein a first of the two sets of runners serve alternate cylinders in the sense of the engine's firing order from the cylinders served by the second of the runner sets.

16. The improvement claimed in claim 11 wherein a first of the two sets of runners serve alternate cylinders in the sense of the engine's firing order from the cylinders served by the second of the runner sets.

17. An improved exhaust manifold for an internal combustion engine of the type that has a plurality of cylinders, a reciprocating piston for each cylinder, and at least one exhaust port and valve for each cylinder for passing products of combustion from the cylinder, the exhaust manifold comprising:

(a) a first set of branches for serving a first set of the engine's cylinders;

(b) a second set of branches for serving a second set of the engine's cylinders;

(c) the branches of the first set being tuned to a predetermined resonant frequency of the products of combustion to effect resonance within a first selected range of engine speeds; and (d) the branches of the second set being tuned to a predetermined resonant frequency of the products of combustion to effect resonance within a second selected range of engine speeds differing substantially from the first selected range of engine speeds to develop with the first set a broad torque band of relatively high value.

18. The improved exhaust manifold claimed in claim 17 wherein:

the branches are tuned to the fundamental frequency of the combustion products.

19. The improved exhaust manifold claimed in claim 18 wherein the exhaust manifold has at least one pipe at the discharge end of the branches.

20. The improved exhaust manifold claimed in claim 17 wherein the cross-sectional area of the first set of branches differs from that of the second set of branches such that the combustion product gas velocity at resonance in each branch is substantially equal to the velocity of such gases at engine maximum torque.

21. The improved exhaust manifold claimed in claim 20 wherein the length of the first set of branches differs from that of the second set of branches.

* * * * *

UNITED STATES PATENT AND TRADEMARK OFFICE
CERTIFICATE OF CORRECTION

PATENT NO. : 4,731,995

DATED : March 22, 1988

INVENTOR(S) : JAMES D. McFARLAND, JR.

It is certified that error appears in the above-identified patent and that said Letters Patent is hereby corrected as shown below:

Column 1, line 57, "effect" should read -- effective --. Column 2, line 68, "resonating" should read -- resonance --. Column 3, line 39, after "manifold" delete ",". Column 3, line 55, after "combustion" insert -- engine --. Column 4, line 9, after "set" insert -- of --. Column 4, line 62, after "head" insert -- , --. Column 5, line 51, after "it" insert -- , --. Column 5, line 61, after "resonance" insert --occurs corresponds to a desired range of speeds where resonance --. Column 5, line 65, "values" should read -- value --. Column 5, line 68, delete "the", first occurrence, insert - which are--. Column 6, line 31, after "shows" insert -- a --. Column 7, line 26, claim 4, line 6, "an" should read -- at --. Column 8, line 7, claim 10, line 5, delete "speed". Column 8, line 11, claim 10, line 9, delete "speed". Column 8, line 18, claim 11, line 4, delete "of", second occurrence.

Signed and Sealed this

Thirty-first Day of January, 1989

*Attest:*

DONALD J. QUIGG

*Attesting Officer*   Commissioner of Patents and Trademarks